United States Patent
Haas et al.

(10) Patent No.: US 8,625,878 B2
(45) Date of Patent: Jan. 7, 2014

(54) METHOD AND SYSTEM OF RAIL COMPONENT DETECTION USING VISION TECHNOLOGY

(75) Inventors: Norman Haas, Mount Kisco, NY (US); Ying Li, Mohegan Lake, CT (US); Charles A. Otto, Lansing, MI (US); Sharathchandra Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 13/087,490

(22) Filed: Apr. 15, 2011

(65) Prior Publication Data

US 2012/0263342 A1 Oct. 18, 2012

(51) Int. Cl.
*G06K 9/00* (2006.01)
(52) U.S. Cl.
USPC .......................................... 382/141; 382/190
(58) Field of Classification Search
USPC .................................................. 382/141, 190
See application file for complete search history.

(56) References Cited

U.S. PATENT DOCUMENTS

| | | | | |
|---|---|---|---|---|
| 4,779,095 A * | 10/1988 | Guerreri | ........................ | 340/904 |
| 6,163,755 A * | 12/2000 | Peer et al. | ...................... | 701/301 |
| 7,216,060 B1 * | 5/2007 | Yano et al. | ..................... | 702/184 |
| 7,406,400 B2 * | 7/2008 | Yano et al. | ..................... | 702/184 |
| 7,411,660 B2 * | 8/2008 | Cho et al. | ....................... | 356/3.01 |
| 7,463,348 B2 * | 12/2008 | Chung | ........................ | 356/237.1 |
| 7,570,794 B2 * | 8/2009 | Swanger et al. | ............... | 382/141 |
| 7,616,329 B2 * | 11/2009 | Villar et al. | ..................... | 356/625 |
| 7,659,972 B2 * | 2/2010 | Magnus et al. | ............. | 356/237.1 |
| 7,692,800 B2 * | 4/2010 | Sanpitak | ........................ | 356/614 |
| 7,714,886 B2 * | 5/2010 | Kilian et al. | ................... | 348/135 |
| 7,755,660 B2 * | 7/2010 | Nejikovsky et al. | ........... | 348/143 |
| 8,081,320 B2 * | 12/2011 | Villar et al. | ..................... | 356/606 |
| 8,493,446 B2 * | 7/2013 | Li et al. | .......................... | 348/148 |

(Continued)

OTHER PUBLICATIONS

International Search Report and Written Opinion, PCT Application No. PCT/US2012/33706, p. 1-8 (Jul. 2, 2012).
Rujiao, D. et al. "Automatic Inspection Method of Steady Arm Slope Based on Computer Vision" IEEE, International Conference on Measuring Technology and Mechatronics Automation, pp. 714-718. DOI 10.1109/ICMTM A.2010.424 (Mar. 2010).

(Continued)

*Primary Examiner* — Jayesh A Patel
*Assistant Examiner* — Iman K Kholdebarin
(74) *Attorney, Agent, or Firm* — Ido Tuchman; Anne V. Dougherty

(57) ABSTRACT

A method, system, and computer program product for automatically inspecting railroad tracks. The method includes assessing a configuration of rail components depicted in an image by comparing the configuration of the rail components to known hazards. The method also includes determining a severity of detected problems in the configuration of the rail components, using a computer processor.

24 Claims, 10 Drawing Sheets

(56) References Cited

U.S. PATENT DOCUMENTS

| | | | |
|---|---|---|---|
| 2004/0263624 A1 | 12/2004 | Nejikovsky et al. | |
| 2006/0017911 A1* | 1/2006 | Villar et al. | 356/4.01 |
| 2007/0217670 A1* | 9/2007 | Bar-Am | 382/141 |
| 2008/0012860 A1* | 1/2008 | Klefenz et al. | 345/441 |
| 2009/0196486 A1* | 8/2009 | Distante et al. | 382/141 |
| 2010/0026551 A1* | 2/2010 | Szwilski et al. | 342/22 |
| 2011/0064273 A1* | 3/2011 | Zarembski et al. | 382/104 |
| 2012/0263342 A1* | 10/2012 | Haas et al. | 382/100 |
| 2013/0101221 A1* | 4/2013 | Fujiki et al. | 382/195 |
| 2013/0176435 A1* | 7/2013 | Haas et al. | 348/148 |

OTHER PUBLICATIONS

Hart, M. J. et al. "A Machine Vision System for Monitoring Railcar Health: Preliminary Results" TD-04-008. Technology Digest: Timely Technology Transfer, pp. 1-4 (Jun. 2004).

Edwards, J. R. et al. "Development of Machine Vision Technology for Railcar Safety Appliance Inspection" University of Illinois at Urbana-Champaign, pp. 1-8.

* cited by examiner

1102  *Fig. 11A*  1104

METHOD AND SYSTEM OF RAIL COMPONENT DETECTION USING VISION TECHNOLOGY

BACKGROUND

The present invention is directed to the field of railroad track inspection, and more specifically to a method and system of rail component detection using vision technology.

To maintain safe and efficient operations, railroads must inspect their tracks for physical defects on a regular basis. Track inspections are not only required by Federal Railroad Administration (FRA) regulations, but also enforced by individual railroad companies, usually with more stringent requirements, to maintain track health to a higher standard. Such track inspection normally covers a wide spectrum of tests, ranging from detecting surface cracks on the rail, measuring rail profile and gauge size, to monitoring the conditions of joint bars, spikes and anchors. Some of these inspections, such as the measurement of the position, curvature and alignment of the track, have already been automated using a track geometry car, yet others, such as monitoring the spiking and anchor patterns, and detecting raised or missing spikes and anchors, are still manually and visually conducted by railroad track inspectors.

SUMMARY

An example embodiment of the present invention is a method for automatically inspecting railroad tracks. The method includes assessing a configuration of rail components depicted in an image by comparing the configuration of the rail components to safety requirements for the rail components. The method also includes determining a severity of detected problems in the configuration of the rail components, using a computer processor.

Another embodiment of the invention is a system for automatically inspecting railroad tracks. The system includes a processor and a memory coupled to the processor. The memory includes computer readable program code embodied on it which is configured to assess a configuration of rail components located in an image by comparing the configuration of the rail components to safety requirements for the rail components and determine the severity of problems in the configuration of the rail components.

A further embodiment of the invention is a computer program product for automatically inspecting railroad tracks. The computer program product includes a computer readable storage medium having computer readable program code embodied on it. The computer readable program code is configured to assess a configuration of rail components located in an image by comparing the configuration of the rail components to safety requirements for the rail components and determine the severity of problems in the configuration of the rail components.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 11A is an example of the anchor detection process as contemplated by the present invention.

DETAILED DESCRIPTION

It is of great interest to railroad companies to enhance the current manual inspection process using machine vision technology for more efficient, effective and objective inspections. It also helps lower maintenance cost and improve track capacity. Aspects of the current invention include 1) monitoring of spiking and anchor patterns; 2) detection of spikes whose heads are raised above the tie plate by more than one inch, as well as spikes that are deadheads; 3) detection of displaced anchors that have moved more than a half inch away from the tie; and 4) detection of any missing bolts, as well as missing nuts and washers, from rail joint bars.

Here, a spiking pattern refers to the layout of spikes on a tie plate, which hold it in place to prevent the rail from latitudinal movement. Specific spiking patterns are required for specific classes of tracks (as well as their degrees of curvature). Applying wrong or non-compliant spiking patterns could potentially lead to derailment. On the other hand, anchors are placed underneath the rail on both sides of a tie to prevent it from longitudinal movement. Typically, how often anchors should be used defines an anchor pattern. Depending on the rail type and the degree of curvature, a specific anchor pattern will be required. Using non-compliant anchor patterns could lead to buckled rail.

Figure 1:
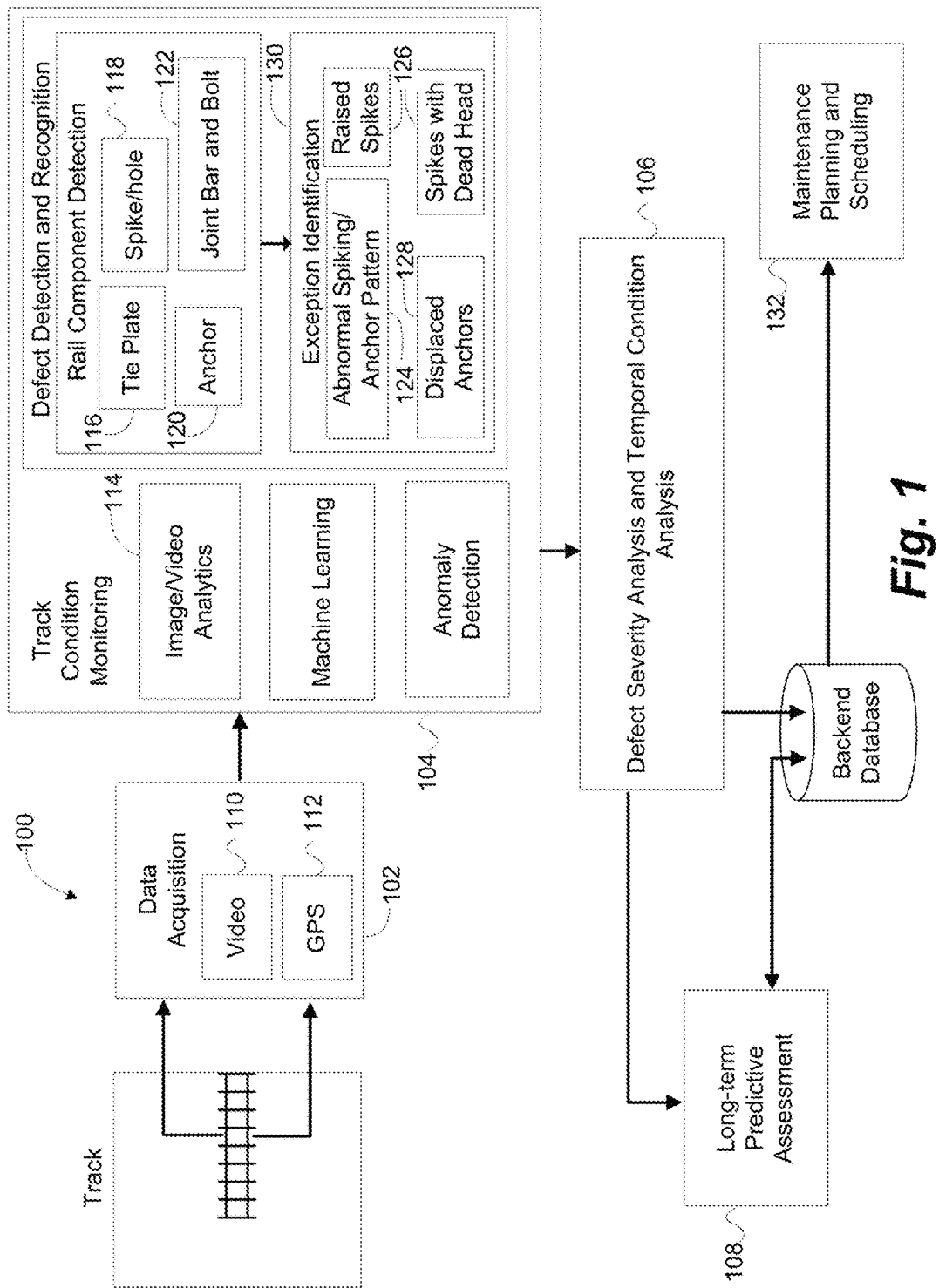
FIG. 1 illustrates an example architecture of a system of automatic railroad track inspection.

FIG. 1 illustrates an example architecture of a system of automatic railroad track inspection. The system 100 includes four major modules, namely, data acquisition 102, track condition monitoring 104, defect severity analysis and temporal condition analysis 106, and the long-term predictive assessment module 108. In a particular embodiment of the present invention, the data acquisition module 102 is in charge of capturing videos 110 using multiple cameras that are mounted on a moving track inspection vehicle. It also records positioning information 112 and synchronizes it with the video 110. Various image and video analytics 114 may then be launched from the track condition monitoring module 104 to detect important rail components including tie plate 116, spike 118, spike hole 118, anchor 120, joint bar and joint bar bolt 122. Next, abnormal spiking and anchor patterns 124, as well as problematic spikes 126 and displaced anchors 128, can be recognized in the exception identification submodule 130.

The severity of such defects may then be further analyzed in the defect severity analysis and temporal condition analysis module 106, and aggregated along the timeline to detect consecutive or repetitive exceptions that warrant immediate report. Such exception information along with positioning data, are sent to a server 132 for maintenance planning purpose. Meanwhile, a comparative and trend analysis of track component condition is performed in the long-term predictive assessment module 108.

Figure 2:
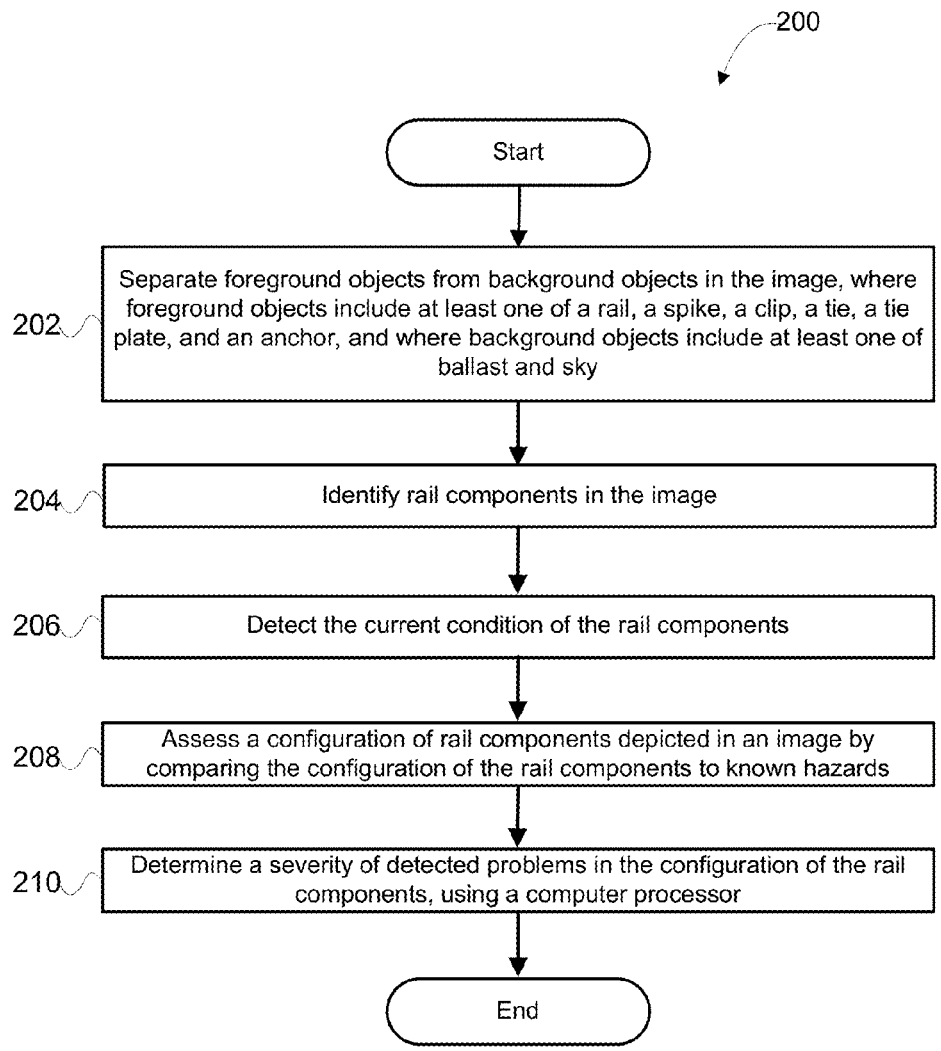
FIG. 2 is a flowchart illustrating an example method for automatically inspecting railroad tracks, as contemplated by the present invention.

FIG. 2 is a flowchart illustrating an example method for automatically inspecting railroad tracks, as contemplated by the present invention. The method 200 includes separating foreground objects from background objects in the image, where foreground objects include a rail, a spike, a clip, a tie, a tie plate, and/or an anchor, and where background objects include ballast and/or sky, at block 202. The method 200 further includes, at block 204, identifying rail components in the image. At block 206, the method 200 further includes detecting the current condition of the rail components. The method 200 also includes assessing a configuration of rail components depicted in an image by comparing the configuration of the rail components to safety requirements for the rail components, at block 208. The safety requirements may originate from, for example, government regulations or private railroad companies. The safety requirements may include the amount of surface cracks on the rail, the rail profile and gauge size, and the conditions of joint bars, spikes and anchors. At block 210, the method 200 includes determining a severity of detected problems in the configuration of the rail components, using a computer processor.

In an embodiment of the invention, the method 200 is included in a four layer hierarchical framework where separating foreground objects from background objects and identifying rail components of the method 200, at blocks 202 and 204, comprise rail component localization. The second layer of the hierarchy, rail component condition detection, includes, at block 206, detecting the current condition of the rail components. The third layer of the hierarchy, configuration state detection, includes assessing a configuration of rail components depicted in an image, at block 208. The fourth layer of the hierarchy, severity detection, includes determining the severity of detected problem in the configuration of the rail components, at block 210.

Rail component localization, at blocks 202 and 204, may be accomplished by different methods contemplated by the present invention. A purpose of rail component localization is to separate foreground objects, which may include rail, spikes, clips, ties, tie plates, and anchors from background objects which may include ballast and sky. The methods of rail component localization may be used individually or in combination to improve overall accuracy.

Figure 3:
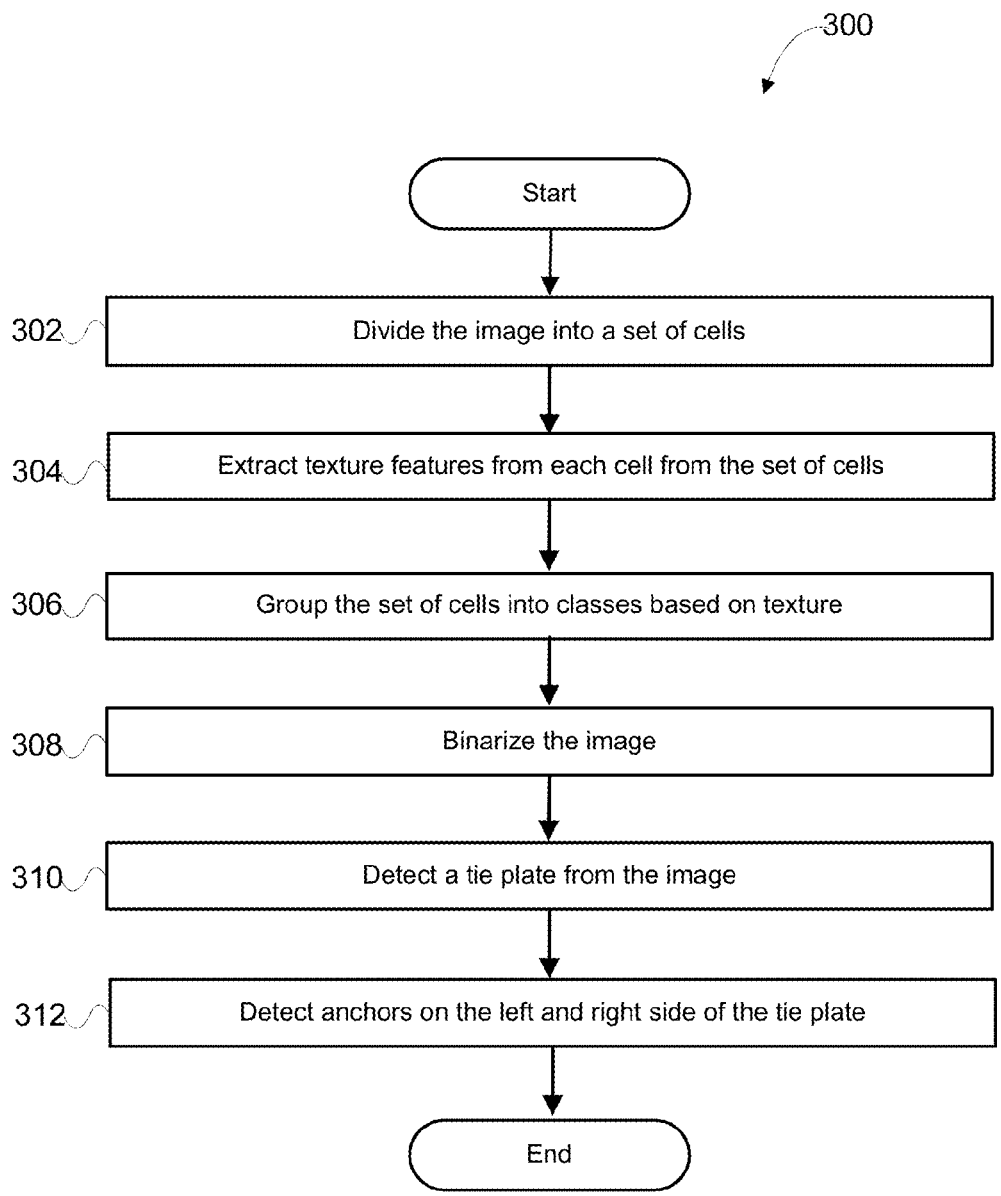
FIG. 3 is a flowchart illustrating an example implementation of the region-based method of rail component localization, as contemplated by the present invention.

FIG. 3 is a flowchart illustrating an example implementation of the region-based method of rail localization, as contemplated by the present invention. The region-based method 300 may include dividing the image into a set of cells, at block 302. In an embodiment of the invention, the image is divided into M×N cells. Texture features may be extracted from each cell, at block 304. The texture features may be used to represent that particular cell. Texture features may include Gabor, Gabor wavelet, wavelet, color, and histogram of oriented gradients. The method 300 may include, at block 306, grouping the set of cells into classes based on texture. In an embodiment of the invention, grouping may take a supervised or unsupervised approach. Supervised approaches may include Support Vector Machine (SVM) and Gaussian Mixture Models (GMM) while unsupervised approaches may include K-means based clustering. At block 308, the method 300 may further include binarizing the image. In an embodiment of the invention, the binarized image has white portions representing areas of the image that make up the class that has the greatest number of members.

The method 300 may also include detecting a tie plate from the image, at block 310. In an embodiment of the invention, detecting the tie plate may include finding the bottom line of a rail. In this embodiment, detecting the tie plate may also include identifying a region that contains a majority of pixels from a class, where the class has the greatest number of members. In a further embodiment, identifying a region that contains a majority of pixels from a class is accomplished by identifying the region that contains the greatest number of white pixels.

The method 300 may further include detecting anchors on the left and right side of the tie plate. In embodiments of the invention various approaches are taken including template-based matching, scale-invariant-feature-transform (SIFT)-based matching or machine learning based approaches including Support Vector Machine (SVM) or AdaBoost.

Figure 4:
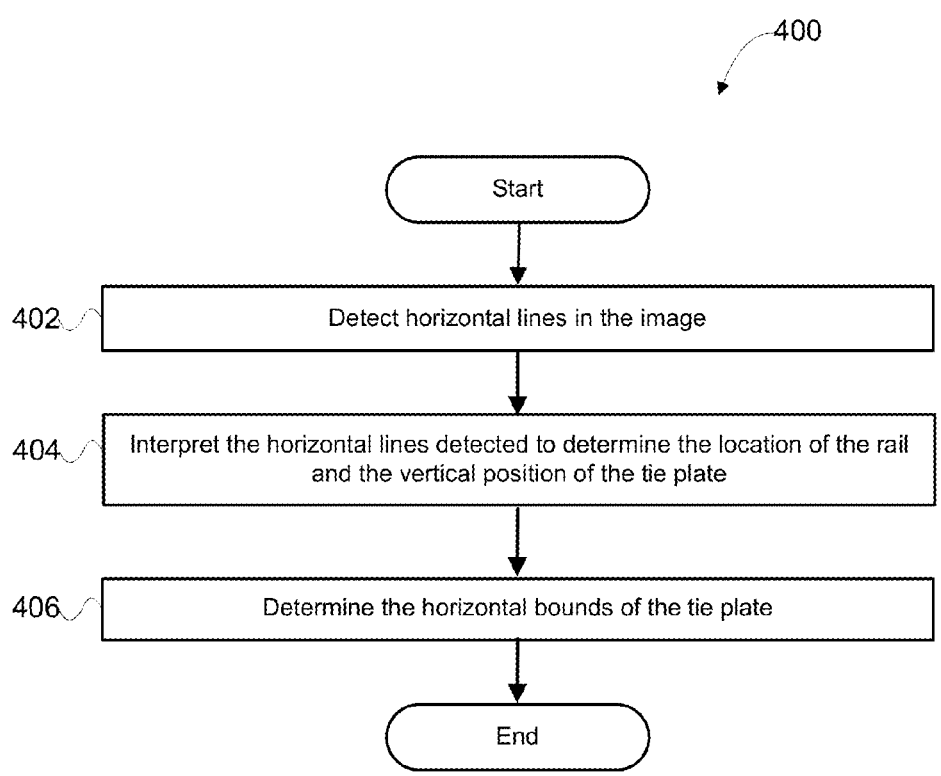
FIG. 4 is a flowchart illustrating an example implementation of the edge-based method of rail component localization, as contemplated by the present invention.

FIG. 4 is a flowchart illustrating an example implementation of the edge-based method of rail localization, as contemplated by the present invention. The method 400 may include detecting horizontal lines in the image, at block 402. Detecting horizontal lines may include using the Hough transform. The method 400 may also include interpreting the horizontal lines detected to determine the location of the rail and the vertical position of the tie plate, at block 404. This may be based on prior knowledge of the rail's structure. At block 406, the method 400 may include determining the horizontal bounds of the tie plate. Determining the horizontal bounds of the tie plate may include detecting vertical lines defining a left boundary and a right boundary of the tie plate using the Hough transform. Determining the horizontal bounds of the tie plate may further include analyzing the distribution of points which voted for the line at the bottom of the tie plate.

Rail component condition detection, at block 206, may use similar image processing approaches to detecting the current conditions of localized rail components. These conditions may include moving or broken ties; present, missing, or loose spikes; missing, broken, or shifted tie plates; or missing or loose anchors. In an embodiment of the current invention, assessing the configuration of rail components, at block 206, further includes detecting the absence of rail components.

Configuration state detection, at block 208, may include applying knowledge from federal regulations or domain experts. This may include information such as three moving ties indicates a problem of loose track, missing spikes for twelve consecutive ties should call for attention, and three missing bolts may indicate a moving fish plate.

Derivation of severity, at block 210, may include determining the severity of problems on a rail and proposing a time frame to correct the problem. In an embodiment of the invention, determining the severity of problems in the configuration, at block 210, is based on a discrepancy between an expected configuration model and a state of the configuration of the rail components. The expected configuration model may be based on the surroundings. Surroundings may include factors such as terrain and land conditions. When determining severity the system may, for example, choose one of four levels. The first level may indicate that a discovered problem would need to be repaired immediately. The second level may indicate that a discovered problem would need to be repaired soon. The third level may indicate that a repair may be needed during the next inspection. The fourth level may indicate that repair may be needed during the next scheduled maintenance window or for use during planning.

Figure 5:
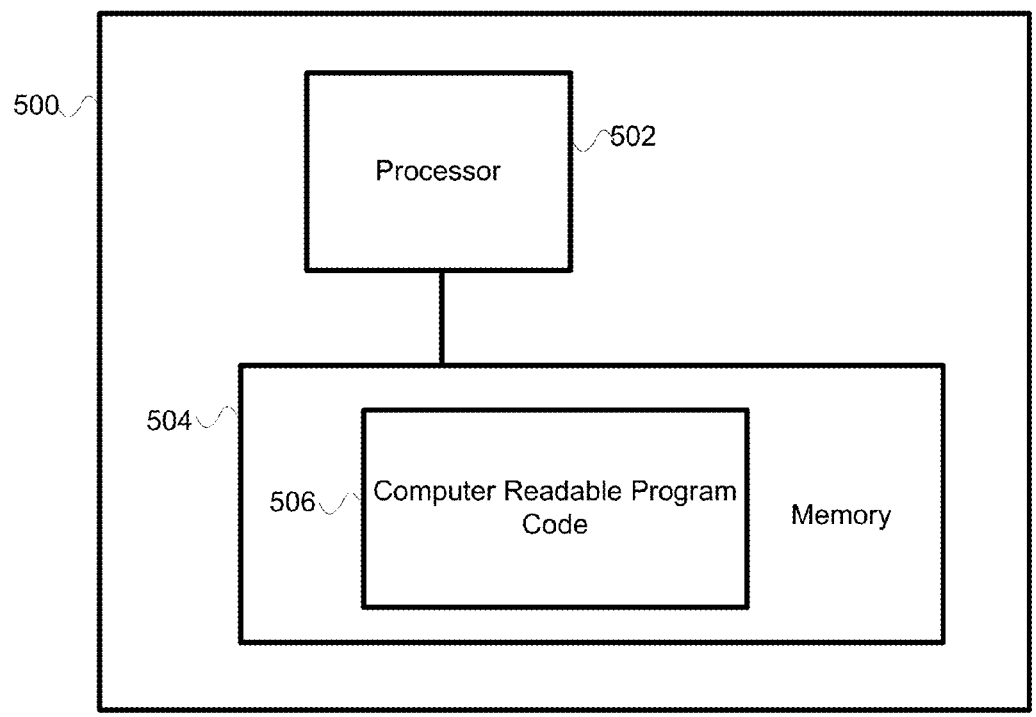
FIG. 5 illustrates a system for automatically inspecting railroad tracks.

FIG. 5 illustrates a system for automatically inspecting railroad tracks. The system 500 includes a processor 502 and a memory 504 coupled to the processor.

The memory 504 may have computer readable program code 506. The computer readable program code 506 may be configured to perform various tasks for the system 500. One such task may include assessing a configuration of rail components located in an image by comparing the configuration of the rail components to safety requirements for the rail components. Another task includes determining the severity of problems in the configuration of the rail components. In a further embodiment of the invention another task includes linking geographical location data with the image.

Figure 6:
FIG. 6 illustrates an example system for automatically inspecting railroad tracks as contemplated by the present invention.

FIG. 6 illustrates an example system for automatically inspecting railroad tracks as contemplated by the present invention. The cameras in the system may include Point Grey Dragonfly2, which provide flexibility in terms of image resolution, frame rate, color mode and the option of using region-of-interest. Four cameras may be used in total, imaging lateral views of the gauge and field sides of both rails. The field of view may be chosen to be 24 inches to obtain 50% overlap of images when traveling at 10 miles per hour, while ensuring total coverage of the track elements we are inspecting.

The four cameras can be mounted on aluminum racks with two degrees of freedom, and the racks may be attached to the rear bumper of a hi-rail truck using trailer hitch pins for quick removability. When the truck travels on the rail, the four captured video streams may be sent over FireWire (1394a) networks to the computer, which may be placed along with a UPS and an inverter in the black 19-inch rack inside the truck. The computer may be a 3.0 GHz Pentium DuoCore, with 2 GB of RAM. Due to the high data volume and limited bandwidths of both the Firewire bus and PCI bus, an image resolution of 640×350 may be chosen with 12 bits of monochrome intensity per pixel, and a frame rate of 20 FPS. An FFDShow encoder may be used to compress the video data before writing them to the disk. A more powerful computer with Solid State Drive may be used as well, to allow the system to accommodate higher inspection speeds.

The video capture tool may contain three major modules including configuration, capture engine and positioning recorder. Specifically, the configuration module can manage camera parameters as well as other user configuration details. The capture engine can issue commands to the cameras, grab image frames and save them into multiple video files. Note that in order to cope with illumination changes and avoid producing either over-exposed or under-exposed images, this module may also analyze the histogram of each frame, then either adaptively adjust the camera parameters including the shutter speed and gain, or linearly stretches the histogram to enhance the image quality, before encoding the frame and writing it to the disk. Finally, the positioning recorder may log latitude and longitude data every second, which then may be synchronized with the video data based on the time stamps.

Figure 7:
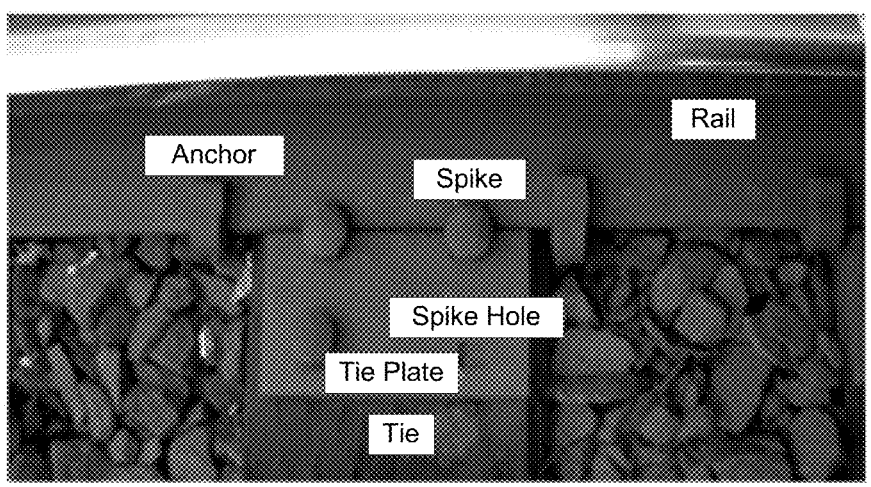
FIG. 7 shows an example of various rail components in a captured video frame as contemplated by the present invention.

FIG. 7 shows an example of various rail components in a captured video frame as contemplated by the present invention. Detecting the tie plate can be the very first step in video analytics, as once it is identified all other components can be located relative to its location.

In an embodiment of the present invention, the rail occupies the upper portion of the image, and may present a very distinct horizontal dividing line from the rest, as shown in FIG. 7. On the other hand, when a tie plate is present, its bottom edge may present another approximately horizontal line. A Hough transform may be used to detect these two lines.

Figure 8A:
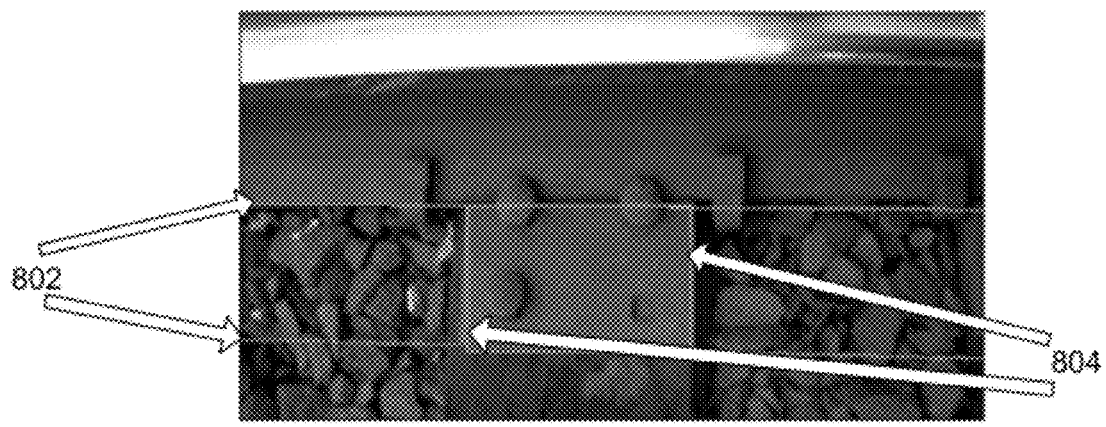
FIG. 8A illustrates an example of a Hough transform performed on an example image as contemplated by the present invention.

FIG. 8A illustrates an example of a Hough transform performed on an example image as contemplated by the present invention. One detection example is shown in FIG. 8A where the two horizontal lines 802 are obtained using a transform-based approach. The two vertical edges of the tie plate 804 may be found by distinguishing the tie plate region from the ballast area, in the following three steps.

Figure 8B:
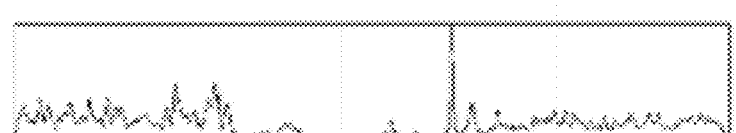
FIG. 8B is an example magnitude map which is plotted according to aspects of the present invention.

Step 1: For the image region between the two detected horizontal lines, an edge map may be computed using the Sobel operator, then the edge magnitude may be summed for each column. FIG. 8B is an example magnitude map which is plotted according to aspects of the present invention.

Figure 8C:
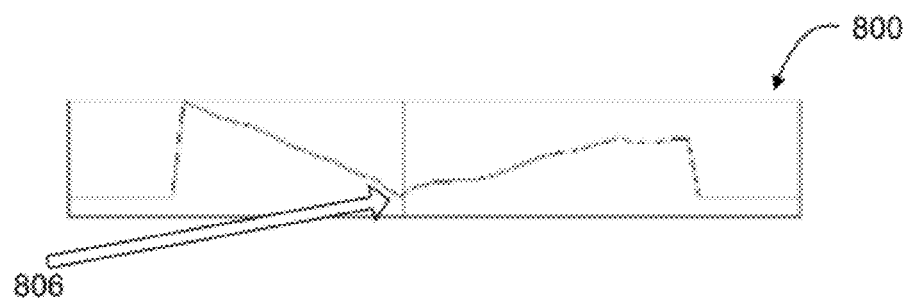
FIG. 8C illustrates an example of summed magnitude map as contemplated by the present invention.

Step 2: For each column, magnitudes may be summed within a window that is centered on it. The window size may approximately equal that of a tie plate. Note that once the imaging setup is fixed, a rough estimate about the tie plate's width can be made based on the image geometry. The height of the tie plate though, could vary depending on the type of plates. FIG. 8C illustrates an example magnitude map as contemplated by the present invention. In the magnitude map 800, from which we see that there is a distinct local minimum 806, which may exactly correspond to the midpoint of the tie plate, indicated by the vertical line.

Step 3: Find the minimum in the above plot, and the tie plate's left and right edges 804 may be derived based on the window size. The final localization result is shown in FIG. 8A, indicated by the rectangle.

Figure 9A:
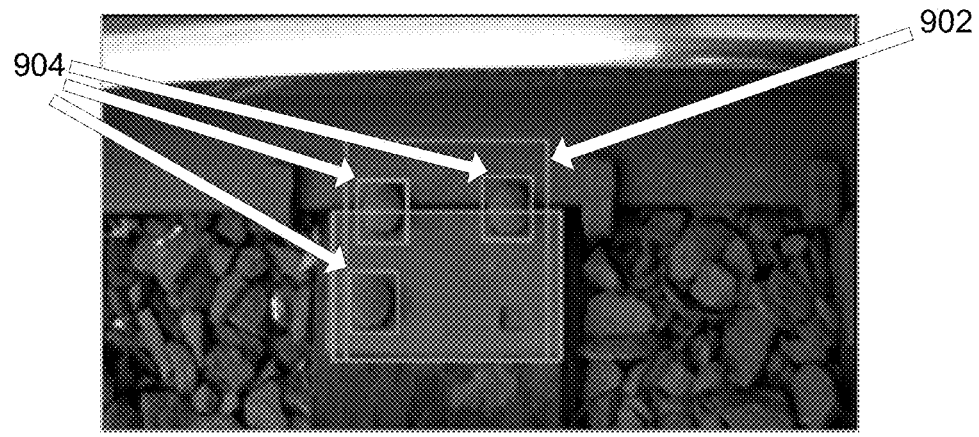
FIG. 9A illustrates the spike search region in an example embodiment of the present invention.
Figure 9B:
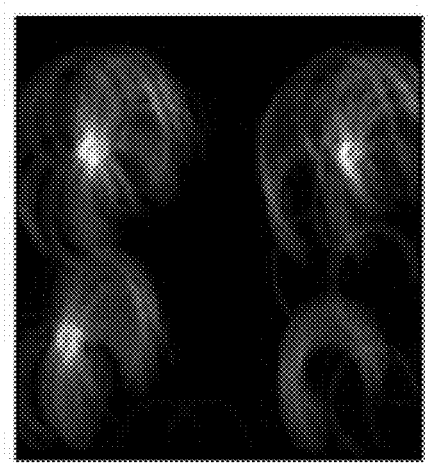
FIG. 9B shows the resulted voting space from an example embodiment of the present invention.

FIG. 9A illustrates the spike search region in an example embodiment of the present invention. To detect spikes, a search region is defined that is slightly expanded beyond the tie plate region 902. A Hough transform may be applied to detect the roughly elliptical shape of spike heads within it. In particular, considering that all spike heads may be of similar size and shape under fixed imaging conditions, the center of an ellipse of approximately fixed size and eccentricity may be searched for. This may be achieved by letting each edge point vote for the shape of the ellipse within a small range of radii, with an assumption of a fixed ratio of major axis to minor axis. FIG. 9B shows the resulted voting space from an example embodiment of the present invention. In FIG. 9B, three bright spots are shown corresponding to the three spike heads.

Finally, the center of each spike head may be detected by repeatedly identifying distinct and well-separated points that receive the most votes, based on some threshold. The bounding box of the spike may then be derived based on the center position and the corresponding search radius being applied. FIG. 9A shows the three detected spike heads 904.

Figure 10A:
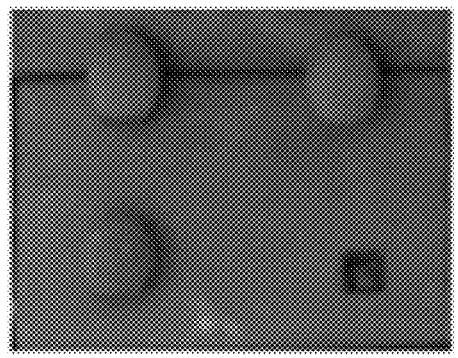
FIG. 10A is an example spike search region as contemplated the present invention.

FIG. 10A is an example spike hole search region as contemplated the present invention. Detecting spike holes that are not filled up by spikes can help determine the spiking pattern of a tie plate. Based on the observation that: a) spike holes tend to present stronger edges than the spike heads, and b) they have approximately symmetrical shapes (square), a three-step detection approach can be used.

Step 1: Given a detected tie plate, extract an extended tie plate region (ETPR) so as to include any possible spike heads in the rail side.

Figure 10B:
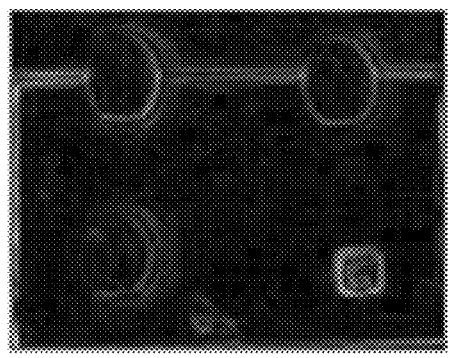
FIG. 10B shows the Sobel edge map of this image region in an example embodiment of the present invention.
Figure 10C:
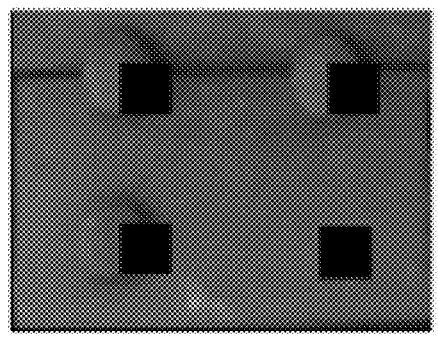
FIG. 10C illustrates four detected Regions of Interest (ROI) in an example embodiment of the present invention.

Step 2: Detect the top four region(s) of interest (ROI) within this ETPR, in terms of the total amount of edge magnitude. The size of ROI approximately equals that of a spike hole. Considering that there could be at most one spike hole in each quadrant of ETPR, this may be achieved by detecting the top ROI in each quadrant. FIG. 10B shows the Sobel edge map of this image region in an example embodiment of the present invention. FIG. 10C illustrates four detected ROI in an example embodiment of the present invention. In FIG. 10C, the four detect ROI are indicated by filled squares. As we can see, these four ROI indeed capture the most edge-rich regions with one referring to the actual spike hole and the other three to spike heads.

Step 3: Given the edge map of each ROI, the following check may be performed: 1) whether the object contained within it has a symmetrical shape. If yes, then very likely it corresponds to a spike hole (see FIG. 10B). This may be done by extracting two parameters from it, namely, the ratio of hCC over AC, and the ratio of vCC over AC. Here, AC refers to the maximum of its auto-correlation, and hCC/vCC refers to the maximum of the cross-correlation between its horizontally/vertically flipped image and itself. Apparently, the larger the two parameters, the more likely the object is symmetrical; and 2) whether most of the prominent edge points reside close to the four boundaries of the ROI. If yes, then it may very likely contain a spike hole.

For the example shown in FIG. 10A-C, after the above step of validation, only the ROI that corresponds to the spike hole remains.

Figure 11B:
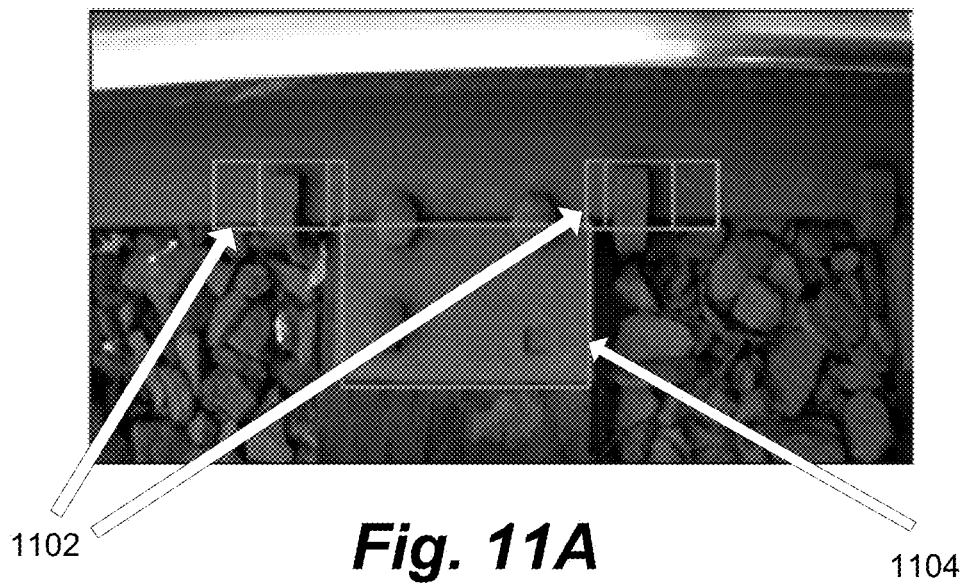
FIG. 11B illustrates a plot of the magnitude map of an example implementation of the present invention.
Figure 11B:
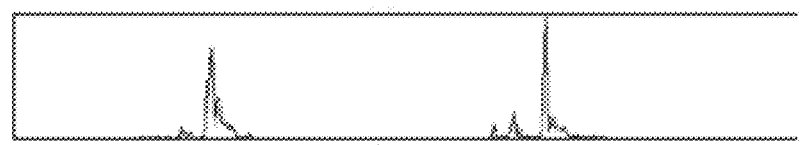
Figure 11C:
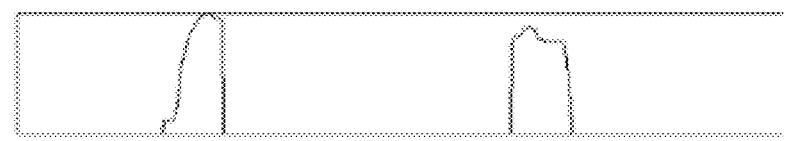
FIG. 11C illustrates an anchor detection plot as contemplated by the present invention.

FIG. 11A is an example of the anchor detection process as contemplated by the present invention. Anchors may normally be fastened against both sides of a tie. Consequently, the two search regions 1102 are defined relative to the detected tie plate 1104 as shown in FIG. 11A. A similar approach may be applied as was used for the tie plate detection to search anchors. Specifically, given all edge points within a search region, non-horizontal gradients may be discarded. The edge magnitudes of the remaining edge points may be summed up for each column. FIG. 11B illustrates a plot of the magnitude map of an example implementation of the present invention. FIG. 11C illustrates an anchor detection plot as contemplated by the present invention. For each column, all magnitudes may be summed up within an anchor-sized window which centers on it, as shown in FIG. 11C. Finally, the maximum from this magnitude accumulation map may be found, and if it exceeds a certain threshold, the corresponding column may be returned as the center of the anchor.

Testing

Several trips were taken to side tracks and main lines to capture data. For each capture session, the hi-rail vehicle was run between 0.25 mile to 1.5 miles at up to 10 mph, then it was backed up to let us capture another session.

Video data under was collected different weather conditions (brightly sunny, partly cloudy and overcast), at different times of day (morning, noon and afternoon) and on different days, as well as with different track alignments (tangent/straight and curved). The collected data also contains a large variety of fastener types: regular tie plates, mountain tie plates (extra large ones), different spiking and anchor patterns, raised spikes, displaced anchors, etc.

To facilitate performance evaluation, an annotation tool was developed to gather the ground truth. Specifically, each object was be annotated by its tight bounding box, along with its condition (e.g. normal, raised, displaced, etc.). The annotations for each video were saved in an XML file.

The concept of a correct match between an annotation and a detection are defined. Specifically, their bounding boxes are denoted as $A_{bb}$ and $D_{bb}$, respectively, a correct match was required to meet three criteria as stated in Table 1.

TABLE 1

| 1. | The intersection ratio $\frac{A_{bb} \cap D_{bb}}{A_{bb}} \geq 60\%$, |
|---|---|
| 2. | The non-intersection ratio $D_{bb} - \frac{A_{bb} \cap D_{bb}}{A_{bb}} \leq 30\%$, |
| 3. | The entity types of the two objects match with each other. |

For a match, if the first two criteria fail but the last criterion is met, it is an under-match; on the other hand, if the first two are met but the last one fails, it is a miss-match. Note that if a detection does not overlap with any annotation, it is called an unmatched detection. Finally, when there are multiple detections passing the first two criteria with respect to one specific annotation, it is matched with the detection that gives the largest overlap ratio, which is calculated as:

$$\frac{A_{bb} \cap D_{bb}}{(A_{bb} - (A_{bb} \cap D_{bb})) + (D_{bb} - (A_{bb} \cap D_{bb}))}.$$

Three metrics are defined for measuring the component detection performance, namely, detection rate (DR), false positive rate (FPR) and false negative rate (FNR). Specifically, for a particular object type O (e.g. spike), these three measurements are calculated as follows: 1) DR(O) equals the number of correct matches of O over its total number of annotations; 2) FPR(O) equals the number of unmatched detections of O over its total number of detections; 3) FPR (O|O') equals the number of mismatches where objects are detected as type O yet annotated as type O', over the total number of detections of O; and 4) FNR(O) equals the total number of unmatched, under-matched, and mismatched annotations of O, over the total number of annotations of O.

Table 2 shows the performance numbers in the form of a confusion matrix. Due to the limited amount of annotation, this evaluation is obtained from test videos that cover a track segment containing in total, 797 tie plates, 2287 spikes, 901 spike holes, and 1483 anchors. From the table we see that overall, an average detection rate of 98.2% over all tie plates, spikes, spike holes and anchors has been achieved. Specifically, tie plate has the highest detection rate (100%), and the spike hole has the lowest (94.23%). On the other hand, the average false positive and false negative rates are 1.57% and 1.78%, respectively.

The most false alarms come from spike hole detector. On the other hand, false alarms of the spike detector are usually caused by foreign objects on the tie plate. The missed detections for spikes, spike holes or anchors, are mainly caused by the weak edge information. This could happen when the material inside the spike hole appears to be of same color/texture to that of the tie plate, or one side of spike head and anchor do not sufficiently stand out from the background, due to the changes of view aspect and lighting conditions.

TABLE 2

| Ground Truth | Tie Plate (tp) | Spike (spk) | Spike Hole | Anchor (achr) | Nothing |
|---|---|---|---|---|---|
| | | | Detection | | |
| Tie Plate | DR (tp) = 100% | | | | FNR (tp) = 0% |
| Spike | | DR (spk) = 99.3% | FPR (hole\|spk) = 0% | | FNR (spk) = 0.7% |
| Spike Hole | | FPR (spk\|hole) = 0% | DR (hole) = 94.23% | | FNR (hole) = 5.77% |
| Anchor | | | | DR (achr) = 99.33% | FNR (achr) = 0.67% |
| Nothing | FPR (tp) = 0.22% | FPR (spk) = 1.56% | FPR (hole) = 4.4% | FPR (achr) = 0.09% | |

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention has been described, it will be understood that those skilled in the art, both now and in the future, may make various improvements and enhancements which fall within the scope of the claims which follow. Thus, the claims should be construed to maintain the proper protection for the invention first described.

The invention claimed is:

1. A method for automatically inspecting railroad tracks comprising:
   assessing a configuration of rail components depicted in an image by comparing the configuration of the rail components to safety requirements for the rail components;
   dividing the image into a set of cells;
   extracting texture features from each cell from the set of cells;
   grouping the set of cells into classes based on the texture features from each cell;
   binarizing the image based on class grouping of the texture features from each cell; and
   determining a severity of detected problems in the configuration of the rail components, using a computer processor.

2. The method of claim 1, wherein determining the severity of detected problems in the configuration is based on a discrepancy between an expected configuration model and a state of the configuration of the rail components.

3. The method of claim 2, wherein the expected configuration model is based on a surrounding.

4. The method of claim 2, wherein the expected configuration model is obtained from a database.

5. The method of claim 1 further comprising:
   detecting a tie plate from the image; and
   detecting anchors on the left and right side of the tie plate.

6. The method of claim 1, wherein grouping the set of cells into classes based on texture is accomplished using at least one of Support Vector Machine (SVM), Gaussian Mixture Models (GMM), and K-means.

7. The method of claim 5 wherein detecting a tie plate from the image comprises:
   finding the bottom line of a rail; and
   identifying a region that contains a majority of pixels from a class of the classes of the set of cells, where the class has a greatest number of members.

8. The method of claim 5, wherein detecting anchors comprises at least one of template based matching, scale-invariant-feature-transform-based matching, and machine-learning based approaches.

9. The method of claim 4 further comprising:
   detecting horizontal lines in the image;
   interpreting the horizontal lines detected to determine a location of the rail and a vertical position of the tie plate; and
   determining a horizontal boundary of the tie plate.

10. The method of claim 9, wherein detecting the horizontal lines comprises using the Hough transform.

11. The method of claim 9, wherein determining the horizontal boundary of the tie plate includes detecting vertical lines defining a left boundary and a right boundary of the tie plate using the Hough transform.

12. The method of claim 9, wherein determining the horizontal boundary of the tie plate includes analyzing the distribution of points which voted for the line at the bottom of the tie plate.

13. The method of claim 1, further comprising, separating foreground objects from background objects in the image, where foreground objects include at least one of a rail, a spike, a spike hole, a clip, a tie, a tie plate, and an anchor, and where background objects include at least one of a ballast object and a sky object.

14. The method of claim 1, further comprising, identifying other rail components in the image including spikes, spike holes, joint bars, joint bar bolts, nuts and washers.

15. The method of claim 1 further comprising, detecting the current condition of the rail components.

16. The method of claim 15 wherein detecting the current condition of the rail components comprises detecting the absence of rail components.

17. The method of claim 14 wherein identifying spikes comprises searching for any elliptical centers voted by edge points within a range of radius with an assumption of a fixed ratio of major axis to minor axis.

18. The method of claim 14 wherein identifying spike holes comprises searching for any regions-of-interest within an extended tie plate region that present strong edges with symmetric shapes.

19. A system for automatically inspecting railroad tracks comprising:
    a processor;
    a memory coupled to the processor, the memory having computer readable program code embodied therewith, the computer readable program code configured to:
    assess a configuration of rail components located in an image by comparing the configuration of the rail components to safety requirements for the rail components;
    dividing the image into a set of cells;
    extracting texture features from each cell from the set of cells;
    grouping the set of cells into classes based on the texture features from each cell;
    binarizing the image based on class grouping of the texture features from each cell; and
    determine the severity of problems in the configuration of the rail components.

20. The system of claim 19 wherein the computer readable program code is further configured to link geographical location data with the image.

21. The system of claim 19, wherein the computer readable program code is further configured to determine the severity of problems in the configuration is based on a discrepancy between an expected configuration model and a state of the configuration of the rail components.

22. The system of claim 21, wherein the expected configuration model is obtained from a database.

23. A computer program product for automatically inspecting railroad tracks, the computer program product comprising:
    a non-transitory computer readable storage medium having computer readable program code embodied therewith, the computer readable program code configured to:
    assess a configuration of rail components located in an image by comparing the configuration of the rail components to safety requirements for the rail components;
    divide the image into a set of cells;
    extract texture features from each cell from the set of cells;
    group the set of cells into classes based on the texture features from each cell;
    binarize the image based on class grouping of the texture features from each cell; and
    determine the severity of problems in the configuration of the rail components.

24. The computer program product of claim 23, wherein determining the severity of the problems in the configuration is based on a discrepancy between an expected configuration model and a state of the configuration of the rail components.

* * * * *